United States Patent
Whitehouse (10) Patent No.: US 9,572,358 B2
(45) Date of Patent: Feb. 21, 2017

(54) TROPICALIZING AGENT

(71) Applicant: NESTEC S.A., Vevey (CH)

(72) Inventor: Andrew Steven Whitehouse, Harrogate (GB)

(73) Assignee: Nestec S.A., Vevey (CH)

(*) Notice: Subject to any disclaimer, the term of this patent is extended or adjusted under 35 U.S.C. 154(b) by 0 days.

(21) Appl. No.: 14/347,354

(22) PCT Filed: Sep. 27, 2012

(86) PCT No.: PCT/EP2012/069026
§ 371 (c)(1),
(2) Date: Mar. 26, 2014

(87) PCT Pub. No.: WO2013/045523
PCT Pub. Date: Apr. 4, 2013

(65) Prior Publication Data
US 2014/0242229 A1    Aug. 28, 2014

(30) Foreign Application Priority Data
Sep. 27, 2011 (EP) .................................... 11182985

(51) Int. Cl.
A23L 1/234 (2006.01)
A23G 1/36 (2006.01)
A23G 1/32 (2006.01)
A23G 1/40 (2006.01)
A23L 3/3454 (2006.01)

(52) U.S. Cl.
CPC . *A23G 1/36* (2013.01); *A23G 1/32* (2013.01); *A23G 1/40* (2013.01); *A23L 3/3454* (2013.01); *A23L 29/231* (2016.08)

(58) Field of Classification Search
CPC ......... A23L 1/0534; A23L 1/064; A23G 1/48; A23G 1/36; A23G 3/343
USPC ................................ 426/615, 543, 601, 593
See application file for complete search history.

(56) References Cited

U.S. PATENT DOCUMENTS 5,106,644 A * 4/1992 El-Nokaly .................... 426/603
5,344,664 A * 9/1994 Fitch et al. .................... 426/631
5,965,179 A   10/1999 Ducret et al.
(Continued)

FOREIGN PATENT DOCUMENTS

EP   0688506    12/1995
JP   5359072     5/1978
(Continued)

OTHER PUBLICATIONS

Europe Office Action for Application No. 12 766 085.0-1358, Dated Mar. 17, 2016, 4 pages.
(Continued)

*Primary Examiner* — Helen F Heggestad
(74) *Attorney, Agent, or Firm* — K&L Gates LLP (57) ABSTRACT

Use of particles of insoluble water-absorbing food ingredient, such as dietary fibre, as carrier for a humectant, such as water of glycerol, for the introduction of the humectant into a chocolate product. Furthermore, a tropicalizing agent comprising discrete particles of insoluble food ingredient material, such as citrus fibre particles, loaded with water or humectant. That tropicalizing agent is dispersed in liquid fat, such as cocoa butter. The tropicalizing agent is used to make chocolate products heat resistant.

11 Claims, 2 Drawing Sheets

(56) References Cited

U.S. PATENT DOCUMENTS

| | | | |
|---|---|---|---|
| 6,010,735 A | 1/2000 | Frippiat et al. | |
| H2095 H | 1/2004 | Young | |
| 2005/0118327 A1 | 6/2005 | Best et al. | |
| 2008/0193590 A1* | 8/2008 | Lundberg | 426/2 |

FOREIGN PATENT DOCUMENTS

| | | |
|---|---|---|
| JP | 06510907 | 12/1994 |
| JP | 0851931 | 2/1996 |
| JP | 2003009770 | 1/2003 |
| WO | 9119424 | 12/1991 |
| WO | 2008025803 | 3/2008 |

OTHER PUBLICATIONS

Japanese Office Action for Application No. P2014-531280, Dispatch No. 285136, Dispatch Date Jun. 28, 2016, 13 pages.

\* cited by examiner

TROPICALIZING AGENT

CROSS REFERENCE TO RELATED APPLICATIONS

The present application is a National Stage of International Application No. PCT/EP2012/069026, filed on Sep. 27, 2012, which claims priority to European Patent Application No. 11182985.9, filed Sep. 27, 2011, the entire contents of which are being incorporated herein by reference.

FIELD OF THE INVENTION

The present invention relates to tropicalizing agents, to methods for the preparation thereof, to methods of tropicalizing chocolate or analogues thereof, and to chocolate or analogues of chocolate containing the tropicalizing agents.

BACKGROUND OF THE INVENTION

Conventionally manufactured chocolate consists of sugars, cocoa solids and protein (usually from milk) homogeneously dispersed in fats and fatty substances originating from cocoa butter. Chocolate analogues contain other vegetable fats in partial/total replacement of the cocoa butter fat. Often the continuous fat phase also contains dairy fat.

Cocoa butter typically starts to soften at about 28° C., with consequent loss of the mechanical strength of the chocolate. This means that at the high ambient temperatures frequently encountered in tropical countries, chocolate becomes sticky or even runny. It tends to stick to the wrapper and fall apart when the wrapper is removed, leaving a semi-liquid mass that can often only be eaten with a spoon if cleanliness is desired. Enrobed chocolate products typically lose integrity under these conditions, with their contents often leaking and individual units tending to stick together in the packaging. Chocolate also loses the 'snap' that is an important (and pleasurable) textural characteristic of chocolate stored and eaten under cooler conditions.

Attempts to produce a chocolate that is resistant to heat are numerous. The approaches most widely used can be divided two main groups: 1) incorporation of high-melting point fats; and 2) creation of a three-dimensional matrix or network of sugar crystals or protein particles that will act as a sponge and hold the fat—thus maintaining the structure of the product even on melting of the fat. Over the last century many different methods have been reported.

There are two major drawbacks to the use of high-melting fats in chocolate. Namely that food regulations in many countries restrict the use of substitutes for cocoa butter in chocolate. Secondly, the high-melting point fats in chocolate-like products give an unpleasant waxy mouthfeel.

Many methods have been described for causing accretion of sugar crystals by adding water or a polyol to chocolate, as originally disclosed in DE 389 127 (1919). CH 409,603 (1962) describes the direct incorporation of water into liquid chocolate mass during production causing a rapid increase in viscosity. As a result, it is impossible to pour the material into moulds or use for enrobing.

EP0189469 (1985) describes the mixing of a liquid polyol with tempered conventional chocolate mass before depositing it into molds. Polyols that are liquid at ambient temperatures (such as glycerol) are preferred, though the patent teaches that higher melting polyols (such as sorbitol) can also be used. The mixture is held at slightly elevated temperatures (24° C. to 35° C.) for a short period of time during which the viscosity rises. This is stated to be the result of a chemical reaction between the fat and the polyol. The time and temperature of the holding period are critical parameters that control the viscosity increase—the viscosity must remain low enough for the subsequent molding or enrobing operations.

In the method described by U.S. Pat. No. 5,445,843 a polyol (such as glycerol) is encapsulated by emulsifying it with a liquid fat (such as molten cocoa butter) and lecithin as an emulsifier, then spray-chilling the emulsion. The emulsion "capsules" (which have an average diameter 100 microns) are added to liquid chocolate mass to achieve a polyol content of from 0.2 to 5% by weight. The product was reported to have remained liquid for several minutes.

The use of emulsification to avoid too rapid an incorporation of water into the chocolate mass is described in U.S. Pat. No. 4,446,166. An oil-in-water emulsion (typically 50% water, 50% fat) is prepared with cocoa butter using lecithin as the emulsifier. The emulsion is cooled and milled to give partially or entirely solid particles that are then added to the chocolate mass at levels of between 2 and 10%. Once incorporated in the warmer liquid chocolate mass, the emulsion particles will melt, releasing the water droplets. A disadvantage of this method is the need to guarantee a homogeneous distribution of the emulsion particles before they melt. Premature release of water causes a sudden increase in viscosity that renders the chocolate unsuitable for molding or enrobing.

EP 0297054 describes a method for homogeneously dispersing water by using an aqueous foam. The foam is stabilized with an edible foaming agent (such as egg albumin) and added to conventionally prepared chocolate mass after tempering. The foam is added at levels that deliver from 0.5 to 2% of water, reportedly with no noticeable increase in viscosity to provide a treated chocolate usable for molding or enrobing. The trapped gases can be removed from the still liquid product by exposing it to reduced pressure. EP0407347 describes a similar method.

EP0393327 discloses another variation in which the aqueous phase of the water-in-oil emulsion contains sugars (such as sucrose or glucose) or polyols (such as sorbitol). The emulsion is prepared with 30 to 60% fat using emulsifying agent at a level of 0.1 to 3%. Described suitable emulsifying agents are lecithin, glycerol fatty acid ester, polyglycerol fatty acid ester, polyglycerol condensed ricinoleic acid ester and sucrose fatty acid ester that has an HLB not more than 7. The level of sugar or polyol in the aqueous phase of the emulsion can be between 20 and 60% and the level of water between 15 and 25%. The sugar or polyol in the aqueous phase is reported to provide smoother texture to the heat-stable chocolate mass. A storage period of about 20 days, however, is required for proper development of internal structure.

A similar method is disclosed in EP0442324, whereby an oil-in-water emulsion is prepared by mixing 30-80% of an oil or fat (for example, cocoa butter) in water containing a small amount of a suitable emulsifier. This emulsion is mixed at a level of about 5% with a conventionally manufactured and tempered chocolate mass that is then molded. It is stated to be important to control the temperature to be no higher than 90° F. to keep the oil-in-water emulsion stable. The homogeneously dispersed water generates a viscosity increase of the chocolate mass during solidification of the finished product. However, it is still necessary to store the molded product for several days to establish heat stability.

U.S. Pat. No. 5,486,376 describes the use of water-in-oil microemulsions to introduce finely dispersed water into chocolate mass. Similarly, U.S. Pat. No. 6,159,526 describes addition of water to the chocolate as a water-in-oil emulsion stabilized by sucrose fatty acid esters (HLB<3). U.S. Pat. No. 6,159,526 is concerned primarily with adding water-based flavors to chocolate.

WO 93/06737 describes methods for making gels/pastes by adding water to "Raftiline" (inulin), starches (potato and corn), "Splendid" (pectin), or gum Arabic. The paste is then mixed into tempered chocolate that is molded.

U.S. Pat. No. 5,468,509 describes a method for adding up to 16% water to chocolate. The chocolate supposedly remains moldable. Two mixtures are prepared. (1) Cocoa is coated with cocoa butter in the presence of an emulsifier and (2) water, a sweetener and milk solids are blended to form an aqueous phase. The two are gently blended and the product molded.

U.S. Pat. No. 5,965,179 aims to circumvent the problems of viscosity increase on the addition of water to chocolate by use of an extruder for processing the chocolate. The water is added as an aqueous gel with microcrystalline cellulose. This gel is injected into the chocolate using a twin-screw extruder so as to form a viscous product containing 3 to 20% of added water.

US2005/0118327 describes the preparation of gel beads comprising 20-50% sugar or polyol, water, emulsifying agent and a gelling agent (hydrocolloids). The gel beads are formed by dispersing a hot aqueous sol (90° C.-95° C.) in a liquid fat in a high shear mixer, to form an emulsion, and then cooling to get gelification of the beads. The gel beads dispersed in fat are blended into molten chocolate mass. One drawback is that the release of the sugar/polyol syrup from the gel beads, requires activation. US2005/0118327 teaches the activation of gel bead degradation by freezing a temperatures of −5° C. to −15° C. It is reported that without this cooling it is necessary to store the products for 10-14 days to develop shape retention properties.

In another approach WO91/19424 describes the preparation of gel beads comprising alginate or pectate, divalent metal ions and a sequestrant for the metal ions. The gel beads are used as fat substitutes.

EP0688506 describes the preparation of gels comprising polyol or polyol/water with gelling agents and alkali or alkali-earth metal salts. The gels are produced by heating to temperatures of 120° C. and are then frozen in liquid nitrogen, before addition to liquid chocolate.

These prior art references have drawbacks such as the release of water into the chocolate mass, which occurs early in the process and is not retarded for long enough for the material to be used for typical enrobing processes; the dispersion and release of water is not under sufficiently fine control to avoid development of unpleasantly gritty textures in the final product; and/or activation or an inconveniently long storage time is required for full development of the structures required to provide stability. Many of the processes are complex, or require additional steps in the production procedure, and/or require the use of emulsifiers and/or gelling agents.

Accordingly there is an ongoing need to provide a tropicalizing agent that delays any substantial increase in viscosity so the materials can be used for conventional molding or enrobing processes and that provides a suitable texture and stability, or integrity, in a chocolate product.

It is an aim of the present invention to provide a tropicalizing agent which minimizes or overcomes one or more disadvantages of the above-mentioned references.

It would be advantageous to provide a tropicalizing agent that provides a heat shape stability, or integrity, in a tropicalized product, and that may be easily industrialised at a reasonable cost.

It would be advantageous to provide a tropicalizing agent that delays any substantial increase in viscosity so the materials can be used for conventional moulding or enrobing processes and that provides heat shape stability, or integrity, in a chocolate product, after a reasonable storage time, without compromising the organoleptic parameters.

SUMMARY OF THE INVENTION

The inventor has developed a substantially different route to introduce water and/or a humectant into chocolate or an analogue thereof to obtain a heat resistant chocolate or analogue thereof. In contrast to approaches of the prior art, the present invention does neither rely on the formation of an emulsion nor on aqueous gels.

It has surprisingly been found by the inventor that insoluble water-absorbing food ingredient particles can be used as a vehicle for the introduction of water and/or a humectant into liquid chocolate mass.

The insoluble food ingredient particles loaded with water and/or a humectant can be added to liquid chocolate mass without any significant viscosity increase over normal processing times, allowing processing of the chocolate by standard moulding or enrobing technologies, and act as a tropicalizing agent, improving heat resistance of the resultant chocolate.

According to one embodiment there is provided a tropicalizing agent comprising a liquid fat component and a plurality of discrete particles of insoluble water-absorbing food ingredient material loaded with water and/or a humectant liquid dispersed in the liquid fat component.

Suitable humectants according to the present invention are food grade humectants liquids. Exemplary humectants according to the invention include propylene glycol, polyethylene glycol, polyols such as glycerol and sugar alcohols such as sorbitol, xylitol, maltitol, mannitol, sugar solution such as fructose, dextrose, galactose, or any mixture thereof. According to a particular embodiment the humectant liquid is a polyol. According to some embodiments the humectant liquid is glycerol. According to another embodiment the humectants liquid is propylene glycol. However other polyols are envisaged such as sugar alcohols.

Exemplary insoluble water-absorbing food ingredient materials have a cellulose component and include microcrystalline cellulose (MCC) and dietary fibres comprising an insoluble cellulose component According to one embodiment the insoluble water-absorbing food ingredient particles are insoluble particles of dietary fibre. Fruit, vegetable and/or cereal fibres are contemplated. Exemplary dietary fibre particles according to the present invention include citrus fibre, apple fibre, oat fibre, potato fibre, pea fibre, wheat fibre, sugar cane fibre, sugar beet fibre, cocoa powder, carob fibre and any mixture thereof. In one preferred embodiment the dietary fibres are selected from citrus fibres, apple fibre, oat fibre and potato fibre. In one embodiment the dietary fibres are citrus fibre. In another embodiment the dietary fibres are potato fibre. In an alternative embodiment the insoluble water-absorbing food ingredient particles are microcrystalline cellulose.

In one preferred embodiment the liquid fat is cocoa butter. The use of cocoa butter as the liquid fat component of the tropicalizing agent is particularly preferred for the preparation of a chocolate product, whereby food regulations in many countries restrict or forbid the addition of other fats to chocolate mass. In another preferred embodiment, the liquid fat includes one or more vegetable fats that are the same as a fat used in preparing a chocolate analogue mass, e.g. for a chocolate compound or compound coating product, so as to increase the compatibility and stability of the tropicalized chocolate analogue mass.

Advantageously the tropicalizing agent of the present invention can be prepared from food ingredients and does not require the use of any emulsifying agent, gelling agent, nor other additive. Advantageously the tropicalizing agent is suitable for use in chocolate, whereby food regulations in many countries restrict or forbid the addition of artificial additives to chocolate.

The invention encompasses a chocolate or chocolate analogue comprising the tropicalizing agent in an amount sufficient to increase the integrity or shape retention of the chocolate or chocolate analogue. In one preferred embodiment, the tropicalizing agent provides from about 0.1 to 5 weight percent polyol and/or water to the chocolate or chocolate analogue.

also In one embodiment there is provided a process for preparing a tropicalizing agent comprising the steps of (a) mixing insoluble water-absorbing food ingredient particles in a liquid fat, (b) adding water and/or a humectant liquid to the mixture of step (a) in an amount to provide a ratio of water and/or humectant liquid to water-absorbing food ingredient particles such that the water and/or humectant liquid is absorbed by the discrete particles.

In one embodiment there is provided a process for preparing a tropicalizing agent comprising the steps of mixing water and/or a humectant liquid with insoluble water-absorbing food ingredient particles in an amount to provide a ratio of water and/or humectant liquid to insoluble water-absorbing food ingredient particles such that the water and/or humectant liquid is absorbed by the discrete particles.

There is also provided a process for tropicalizing chocolate, or an analogue thereof, by combining a chocolate or a chocolate analogue mass, optionally a tempered chocolate mass or untempered chocolate analogue mass, with a tropicalizing agent according to the present invention so as to increase the structure of the tropicalized chocolate mass. Preferably, the amount of tropicalizing agent is sufficient to increase the shape retention of the tropicalized chocolate mass compared to a non-tropicalized mass.

The invention also encompasses the use of insoluble water-absorbing food ingredient particles as a carrier for water and/or a humectant, for the introduction of water and/or a humectant into a chocolate product. In another aspect the invention encompasses the use of insoluble water-absorbing food ingredient particles loaded with water and/or a humectant liquid for improving the heat shape stability of a chocolate product.

In another aspect the invention encompasses the use of a tropicalizing agent comprising discrete particles of insoluble water-absorbing food ingredient material loaded with water and/or a humectant, for improving the heat shape stability of a chocolate product.

In another aspect the invention encompasses the use of a tropicalizing agent comprising a liquid fat component and discrete particles of insoluble water-absorbing food ingredient as a carrier component loaded with water and/or a humectant, the discrete particles of carrier component loaded with water and/or a humectants being dispersed in the liquid fat component, for improving the heat shape stability of a chocolate product.

Advantageously the tropicalizing agent of the invention can be added to liquid chocolate mass without inducing any significant increase in viscosity of the liquid chocolate mass over time, such that the chocolate mass can be worked and moulded, or used for enrobing, in conventional industrial production processes, whilst at the same time providing a chocolate product that exhibits improved shape stability at elevated temperatures above room temperature, e.g. at temperatures up to 40° C., and even at higher temperatures.

The chocolate product is dry to the touch and does not stick to its wrapper, or adopt the shape of the wrapper, even when exposed to temperatures above the melting range of the fat composition.

Advantageously good texture and organoleptic properties of regular chocolate are retained. This is exemplified by the fact that chocolate products comprising the tropicalizing agent according to the invention are found to exhibit the expected organoleptic properties of regular chocolate when eaten at room temperature, e.g. snap, melt in the mouth, smooth texture and without any intrusive different (non-chocolate) flavours. Advantageously, the effect occurs whilst being able to minimize or avoid the gritty textural quality that is associated with large sugar crystal clusters.

Advantageously the preparation of the tropicalizing agent according to the present invention, and chocolate or chocolate analogue product the tropicalizing agent uses simple and cost effective processes, suitable for industrial application, requiring no harsh conditions or expensive machinery. Advantageously the tropicalizing agent of the present invention requires only few ingredient components, and can be prepared with commercially available food ingredients. No expensive additives are required.

DETAILED DESCRIPTION OF THE INVENTION

The inventor of the present invention has surprisingly found that insoluble water-absorbing food particles can be used as a vehicle for the introduction of water and/or a humectant into liquid chocolate mass.

Surprisingly the effect is to produce no significant increase in viscosity of the liquid chocolate mass over time such that the chocolate mass can be worked and moulded in conventional industrial production processes, whilst producing a "tropicalized" chocolate product that exhibits improved shape stability at elevated temperatures above room temperature, e.g. at temperatures up to 40° C., and even at higher temperatures. Advantageously, the effect occurs whilst maintaining the expected organoleptic properties of regular chocolate, and whilst being able to minimize or avoid the gritty textural quality that is associated with large sugar crystal clusters Without wishing to be bound by any theory it is understood that the water and/or humectant liquid is absorbed by the insoluble water-absorbing food particles such that the release of the water and/or humectant into the chocolate mass is delayed. The release of water and/or humectant from the tropicalizing agent dispersed in the chocolate mass causes the later development with time of a three-dimensional structuring of the dispersed particles into a self-supporting matrix capable of retaining the liquid fat and maintaining the shape of the confectionery item when that fat is molten or substantially liquid.

The insoluble water-absorbing particles can include particles of any suitable food ingredient material which have capacity to absorb water whilst retaining a solid structure, i.e. retaining the structure of discrete solid particles. The insoluble food grade particles remain independent solid particles when loaded with several times their own weight of the water and/or humectant liquid component. Insoluble water-absorbing particles have an insoluble framework that withstands hydration and a high porous volume or material swelling capacity. The insoluble water-absorbing food ingredient particles loaded with water and/or humectant liquid exist as discrete particles and do not form a gel. Without wishing to be bound by any theory it is understood that the particles of insoluble water-absorbing food ingredient loaded with water and/or humectants liquid form a crowded dispersion of discrete particles in the liquid phase.

Typical suitable materials include cellulosic structures. For instance natural dietary fibres with a mixture of pectic components and cellulosic components exhibit good capacity to absorb water whilst retaining a solid structure. Exemplary insoluble water-absorbing food ingredient materials according to the invention include microcrystalline cellulose (MCC) and dietary fibres with cellulosic components. According to a preferred embodiment the insoluble water-absorbing food ingredient particles are selected from water-absorbing insoluble particles of dietary fibres. Fruit, vegetable and/or cereal fibres are contemplated, such as citrus, apple, kiwi fibre, blackcurrant, tomato, carrot, oat, pea, potato, carob, sugar cane, sugar beet, cocoa or wheat fibre, or other water absorbing insoluble dietary fibres. Exemplary dietary fibre particles according to the present invention include citrus fibre, apple fibre, oat fibre, potato fibre, pea fibre and any mixture thereof. Suitable dietary fibre particles are commercially available. According to one preferred embodiment the insoluble water-absorbing particles are citrus fibre particles, alone or in combination with other insoluble water-absorbing dietary fibre particles. In an alternative embodiment the insoluble water-absorbing food ingredient particles are potato fibre. In another embodiment the insoluble water-absorbing food ingredient particles are microcrystalline cellulose.

Suitably the particles can have an average particle size of between 5 and 200 microns, preferable between 10 and 100 microns. The size of dispersed particles in chocolate or compound influences their detection on the palate and the eating quality of the confection. Small particles below the organoleptic limit (~50 microns), i.e. particles having an average particles size of less than about 50 microns, are preferred, for instance particles having average particle size of at least about 10 microns less than about 50 microns. Particles of a desired size, e.g. particles of less than about 50 microns can be fractionated from commercially available powders, e.g. fibre powders, by sieving or manufactured by size reduction milling.

The water absorbing particles can be loaded with water, humectant liquid or a mixture of water and/or humectant liquid. The tropicalizing agent comprises water and/or humectant in any ratio. According to one embodiment the tropicalizing agent comprises water and a humectant liquid in a water:humectant ratio of from 1:10 to 10:1 w/w, preferably in a water:humectant ratio from 1:2 to 2:1 w/w, for instance in a water:humectant ratio of about 1:1. According to one embodiment the tropicalizing comprises water and a polyol in a water:polyol ratio of from 1:10 to 10:1 w/w, preferably in a water:polyol ratio from 1:2 to 2:1 w/w, for instance in a water:polyol ratio of about 1:1.

Suitable humectants according to the present invention are food grade humectants liquids. The humectant is in a liquid form, and may be in the form of a solution in water. Exemplary humectants according to the invention include propylene glycol, polyethylene glycol, polyols such as glycerol, sorbitol, xylitol, maltitol, mannitol, sugar solution such as fructose, dextrose, galactose, or any mixture thereof. In some embodiments the humectant is a sugar solution, particularly a solution of a monosaccharide in water, for instance a solution of fructose, dextrose, galactose or any mixture thereof in water.

In some embodiments the humectant is a polyol. A preferred polyol is glycerol. However other polyols are envisaged such as sugar alcohols, e.g. sorbitol, xylitol, erythitol, maltitol, mannitol. According to certain embodiments the polyol is selected from glycerol, sorbitol, xylitol or any mixture thereof. According to other embodiments the humectant liquid is propylene glycol. According to some embodiments the humectant is a mixture of a polyol, such as glycerol, together with another humectant liquid, such as another polyol and/or propylene glycol.

Water can be pure potable water or can be provided as part of an aqueous solution, such as for instance an aqueous solution of carbohydrates, polyols, salts and/or proteins. For example water may be provided in the form a fruit juice, or in the form of milk. In a preferred embodiment water is used alone, i.e. pure water.

The hydrophilic water-absorbing particles contain by absorption and/or adsorption glycerol and/or water.

The upper limit on the water and/or glycerol in the tropicalizing agent is largely governed by the swelling and water retention properties of the particles. Swelling of particles on hydration and plasticising with water and/or humectant liquid, such as glycerol, increases with increased liquid loading and thereby increases the particles volume fraction in the dispersion. Over-loading the particle capacity risks engulfing them in water and/or a humectant liquid, and leading to the formation of a non-dispersed phase in the liquid fat component. Such overloading therefore has a negative effect on the liquid retaining protective properties of the particle and influences the ability of the tropicalizing agent to inhibit significant viscosity rise on addition to liquid chocolate mass, and the development of shape stability of the chocolate product. The upper limit on the water and/or humectant liquid in the tropicalizing agent is therefore dependent on the particular type of particles selected, i.e. in view of the swelling and water retention properties of the particulate material. The lower limits for water and/or humectant liquid loading are governed largely by the desired content of tropicalizing agent in the chocolate product for obtaining a water and/or humectant liquid load sufficient to provide the desired shape stability properties.

Suitably the tropicalizing agent comprises the water and/or humectant liquid component and the insoluble water-absorbing food particles in ratio of from about 1:10 to about 8:1 w/w, for instance from about 1:10 to about 6:1 w/w, preferably from about 1:10 to about 5:1 w/w. In one embodiment the water and/or humectant component and the insoluble water-absorbing food particles are present in ratio of from about 1:5 to about 5:1 w/w, preferably in a ratio of about 1:3 to about 3:1, for example in a ratio of from about 2:1 to about 1:2.

In one embodiment the tropicalizing agent comprises a dispersion of the hydrophilic water-absorbing particles in a liquid fat component.

The liquid fat component can be any vegetable fat or oil suitable for use in edible foods. The fat component should be compatible with the chocolate or chocolate analogue to which it will be added. Suitable fats include cocoa butter, cocoa butter equivalents (CBE), cocoa butter substitutes (CBS), vegetable oils and butter oils amongst others. Suitable CBE and CBS are widely commercially available. Exemplary CBE include Coberine™ (Loders Croklaan), and Illexao™ SC70 (AarhusKarlshamn). Exemplary CBS include the Palkena™ Range and Melano™ Range (Fuji Oil).

Preferably, the liquid fat includes cocoa butter, particularly where the tropicalizing agent will be used in chocolate products. In one preferred embodiment the liquid fat is cocoa butter and tropicalizing agents are included in regular chocolate, rather than chocolate analogues.

However, the liquid fat can include one or more cocoa butter substitutes, particularly where the tropicalizing agent will be used in chocolate analogues. In another embodiment, the liquid fat preferably includes one or more vegetable fats, e.g., non-lauric vegetable fats. Where the tropicalizing agent will be used in a chocolate analogue, the vegetable fat is preferably the same fat or at least one of the same fats, used in preparing the chocolate analogue mass so as to increase the compatibility and stability of the tropicalized chocolate mass.

The amount of the liquid fat component in the tropicalizing agent should be sufficient to allow the dispersion of the particles, loaded with glycerol and/or water therein, so as to retain free-flowing behaviour of the particles during preparation of the tropicalizing agent. A sufficient amount of liquid fat component can typically include from about 30 to about 95 weight percent, preferably about 40 to about 80 weight percent of the tropicalizing agent, for instance from about 50 to about 70 weight percent of the tropicalizing agent.

According to one embodiment a tropicalizing agent according to the invention may be prepared by a very simple process comprising the steps of (a) mixing the insoluble water-absorbing food ingredient particles in the liquid fat component to form a dispersion, and (b) adding the water and/or humectant liquid component with mixing.

The preparation process should be carried out a temperature above the melting point of the fat components. For instance where the fat component is cocoa butter a temperature of 40° C. or above, such as around 50° C. may be preferred. Where a fat component, such as an oil, which is liquid at room temperature is used then the preparation of the tropicalizing agent can be carried out at room temperature, i.e. without any heating.

In one variant of the process, the dispersion of particles in a portion of the liquid oil component is blended with an emulsion of the polyol and/or water component in a second portion of the liquid oil component.

An emulsion of the polyol and/or water component in the liquid oil component can be carried out by simple mixing of the components with agitation, for instance in conventional mixing/blending apparatus. Optionally an emulsifying agent may be added in order to facilitate emulsion formation. The emulsifier component can be any suitable emulsifier. Preferably, the emulsifier component includes lecithin, e.g. soy lecithin. The emulsifier, when used, is typically present in the tropicalizing agent in an amount from about 0.001 to 2 weight percent, preferably from about 0.10 to 1 weight percent, for example 0.10 to 0.5 weight percent based on the total weight of the tropicalizing agent.

The prepared tropicalizing agent can be maintained molten for later addition to a liquid chocolate mass. Alternatively the tropicalizing agent can be allowed to cool and solidify for storage and distribution, and can be remelted for addition to liquid chocolate, or can be particulated or flaked for 'dry' addition to liquid chocolate, upon which the fat melts and the particles disperse.

In an alternative the tropicalizing agent can prepared without addition of a liquid fat component, and the insoluble food particles loaded with water and/or humectant liquid can be mixed with liquid chocolate mass without first forming a dispersion in a liquid fat component. For instance the tropicalizing may be prepared by mixing the insoluble water-absorbing food particles with the water and/or humectants liquid component, whereby the insoluble water-absorbing food particles absorb the water and/or humectant liquid to become loaded with water and/or humectant liquid. The loaded particles may then be added to liquid chocolate mass with mixing to disperse the loaded particles in the liquid chocolate. In a preferred embodiment the mixture of insoluble food ingredient particles and water and/or humectants is allowed to equilibrate for a period of time, such as from 1 to 48 hours, in order to optimize the absorption of water and/or humectants by the insoluble food ingredient particles, before addition to the liquid chocolate mass.

Accordingly the tropicalizing agent according to the invention can be prepared in a very simple and cost-efficient manner without the need for harsh conditions or for any complex apparatus.

The tropicalizing agent of the invention can be dispersed within chocolate and chocolate analogue products to improve the shape retention of the resultant chocolate product even at high temperatures, such as those up to about 40° C. The temporarily entrapped water and/or humectant liquid component of the tropicalizing agents is dispersed within the chocolate or an analogue thereof, with the particulate carrier. The addition of the food particles loaded with water and/or humectant liquid dispersed in a liquid fat component facilitates the efficient and homogeneous dispersion of the loaded particles in the hydrophilic liquid chocolate mass. Without being bound by theory, it is understood that the delayed release of water and/or humectant liquid from the tropicalizing agent dispersed in the chocolate mass causes the development of a three-dimensional structuring of the dispersed particles into a self-supporting matrix capable of retaining the liquid fat and maintaining the shape of the confectionery item when that fat is molten or substantially liquid, thereby maintaining the structure of the chocolate product even at elevated temperatures, e.g. up to about 40° C.

The tropicalizing agent can be added to liquid chocolate and dispersed by agitation, either manual agitation and/or with use of standard conventional mixing apparatus. Advantageously the fat-based tropicalizing agent is readily dispersed in a liquid chocolate to provide a substantially uniform and homogeneous dispersion of the food particles through the liquid chocolate mass.

The tropicalizing agent can be added to liquid chocolate either before, after, or in combination with tempering of the chocolate. Increase in viscosity of the chocolate following addition of the agent is delayed to such a degree as to permit the tempering process (manually or by machine, thermally/mechanically or by addition of seeding agent or pre-crystallised chocolate mass) without making the chocolate subsequently unworkable and without blocking the tempering machine and its associated pipes and pumps.

The release of water and/or humectant liquid upon addition of the tropicalizing agent of the invention to a liquid chocolate mass is sufficiently slow to avoid a significant increase in the viscosity of the liquid chocolate mass for a period of hours, making the tropicalized food product suitable for use in the manufacture of moulded or enrobed products by conventional industrial processes. By "significant increase" it is meant a viscosity increase that would prohibit a conventional moulding or enrobing process. Preferably, the viscosity increase is less than about 20 percent, more preferably less than about 10 percent.

The proportion of agent to be added to the chocolate or compound mass is gauged on the quantity of water and/or humectant liquid required to provoke the development of adequate heat stability in desired time. Typically, suitable content of water and/or humectant in the finished chocolate product may range from about 0.1 to about 5 weight percent based on the total weight of the chocolate product. In a preferred embodiment the tropicalizing agent is added to the chocolate mass in an amount to provide a water and/or humectant content in the final chocolate product of from about 0.5% to about 3%, more preferably about 0.5% to about 2% wt/wt.

Addition of too much tropicalizing agent, or of tropicalizing agent in which contains a too high proportion of water and/or humectant liquid component to particulate carrier component, can tend to cause too rapid an increase in viscosity, particularly if multiple of these factors are present, for the product to be suitable for moulding, enrobing, or both. Addition of too little tropicalizing agent can cause a delay in the time over which the desired heat shape stability properties are developed, or even failure to produce the desired heat stability properties. Such concentrations and sizes can be readily determined through routine experimentation by those of ordinary skill in the art once reference is made to the invention described herein.

According to one embodiment the fat content, e.g. cocoa butter content of the starting chocolate mass, to which the tropicalizing agent is to be added, is reduced compared to the desired final fat content, by an amount such that the fat content, e.g. cocoa butter, of the tropicalizing agent provides the remaining fat amount, to produce a final chocolate product having the desired fat content.

Advantageously, the resultant chocolate products including a tropicalizing agent according to the invention do not stick to a wrapper, or adopt the shape of the wrapper, at elevated temperatures, even at temperatures as high as 40° C., do not result in adverse appearance or mouthfeel, and in chocolate or analogues thereof do not have adverse effects on bloom. Moreover, the tropicalized chocolates and chocolate analogues have improved shape retention at elevated temperature, even at temperatures as high as 40° C. compared to corresponding regular chocolate or chocolate analogue product without the tropicalizing agent. Another advantage that can be obtained with the present invention is the ability to use conventional natural food ingredients only, such as water and dietary fibres, while still achieving the good tropicalizing effect. Advantageously the tropicalizing agent of the present invention are suitable for use in regular chocolate, as they can use only ingredients allowed under food regulations in the manufacture of chocolate.

The tropicalizing agents can be added to any type of chocolate e.g. white, milk, dark chocolate or any intermediate, or any type of chocolate analogue e.g. compound coating. The heat resistance can be expected to develop most effectively in masses containing a high proportion of sugar and milk particulate solids of fine granulometry and relatively low fat content due to the loading and proximity of the building blocks of the particle network.

The chocolate and chocolate analogues including tropicalizing agent of the invention can advantageously be used in tropical countries where hot weather causes frequent or rapid melting of chocolate, chocolate analogues. For example, chocolate analogues including coatings and covertures, which are thin and tend to melt rapidly, can surprisingly and advantageously be formed with the tropicalizing agent of the invention. The food products including tropicalizing agent of the invention remain non-sticky so as to smoothly slide out of a wrapper and to avoid leaving food product on the consumer's fingers during consumption.

The term "tropicalizing agent," as used herein, generally refers to suitable materials according to the invention that increase the stability, or structural integrity, in a tropicalized food product into which they are incorporated. This structural integrity typically develops over the course of a brief storage time, and can permit the food product(s) into which the tropicalizing agent is incorporated to remain substantially or entirely solid or unmelted even under tropical temperatures, such as up to about 40° C. The term "tropicalizing agent" thus includes materials that provide foodstuffs with the characteristics of shape retention, heat resistance, and preferably both. Preferably, the term tropicalizing agent can also refer to suitable materials that also delay or avoid any substantial increase in viscosity of the foodstuff into which they are incorporated.

The term "about," as used herein, should generally be understood to refer to both numbers in a range of numerals. Moreover, all numerical ranges herein should be understood to include each whole integer within the range.

All patent and non-patent references cited in the present application, are hereby incorporated by reference in their entirety.

The invention will now be described in further details in the following non-limiting examples.

EXAMPLES

Example 1

Preparation of a Tropicalizing Agent According to One Embodiment of the Invention, Comprising Glycerol Tropicalizing agent was prepared with a composition as follows:

| Cocoa Butter | 3 parts | 50% |
|---|---|---|
| Herbacel AQPlus Citrus Fibre | 1 part | 17% |
| Glycerol | 2 parts | 33% |

100 g of dry citrus fibre powder was dispersed in 300 g of molten cocoa butter at a temperature of 55° C. using a high shear stator-rotor benchtop mixer (Silverson Machines Ltd, Chesham, Bucks, U.K. Model: L2R) operating at medium speed setting for a duration of 2 minutes.

200 g of glycerol was warmed to 55° C. and added slowly and incrementally to the dispersion of fibre with continuous high speed mixing. A homogeneous mix of all three components was made, the glycerol being evenly distributed amongst the dispersion of fibre particles. The total period of mixing during the addition of glycerol was 15 minutes.

The mixture was allowed to cool and solidify at ambient temperature. Alternatively the mixture can be stored warm (e.g. at around 50° C.) ready for later use.

Example 2

Preparation of a Tropicalizing Agent According to One Embodiment of the Invention, Comprising Water Tropicalizing agent was prepared with a composition as follows:

| Cocoa Butter | 3 parts | 50% |
| Herbacel AQPlus Citrus Fibre | 1 part | 17% |
| Water | 2 parts | 33% |

100 g of dry citrus fibre powder was dispersed in 300 g of molten cocoa butter at a temperature of 55° C. in the liquidizer jug attachment of a Kenwood Multi-Pro food processor operating at maximum speed. 200 g of potable water was warmed to 55° C. and added slowly and incrementally to the dispersion of fibre whilst the high speed mixing was maintained. A homogeneous mix of all three components resulted, the water being evenly distributed amongst the dispersion of fibre particles. The total period of mixing during the addition of water was 15 minutes. The mixture was stored warm (50° C.) ready for later use.

Alternatively the mixture can be allowed to cool and solidify, e.g. at ambient temperature.

Example 3

Preparation of a Tropicalizing Agent According to One Embodiment of the Invention, Comprising Water and Glycerol Tropicalizing agent was prepared with a composition as follows:

| Cocoa Butter | 3 parts | 50% |
| Herbacel AQPlus Citrus Fibre | 1 part | 16.7% |
| Water | 1 part | 16.7% |
| Glycerol | 1 part | 16.7% |

100 g of dry citrus fibre powder was dispersed in 300 g of molten cocoa butter at a temperature of 55° C. in the liquidizer jug attachment of a Kenwood Multi-Pro food processor operating at maximum speed.

100 g of potable water and 100 g of glycerol were mixed by manual stirring in bowl and warmed to 55° C.

The water/glycerol mix was added slowly and incrementally to the dispersion of fibre whilst the high speed mixing was maintained. A homogeneous mix of all three components was made, the water and glycerol being evenly distributed amongst the dispersion of fibre particles. The total period of mixing during the addition of water and glycerol was 15 minutes.

The mixture was stored warm (50° C.) ready for later use. Alternatively the mixture can be allowed to cool and solidify, e.g. at ambient temperature.

Example 4

Preparation of a Tropicalizing Agent According to One Embodiment of the Invention, Comprising Glycerol Tropicalizing agent was prepared with a composition as follows:

| 1) Cocoa Butter | 1.5 part | 30% |
| Herbacel AQPlus Citrus Fibre | 1 part | 20% |
| 2) Cocoa Butter | 1.5 part | 30% |
| Glycerol | 1 part | 20% |
| Lecithin | | 1% |

1) 200 g of fibre was dispersed in 300 g of cocoa butter at 50° C. using a Silverson Mixer, to form a dispersion.
2) 200 g of glycerol was emulsified in 300 g of cocoa butter at 50° C. using a Silverson Mixer at maximum speed. A small dose of lecithin equivalent to approximately 1% of the total mix was used to help form the emulsion.
3) The emulsion was poured steadily into the dispersion under agitation by manual stirring with a spatula in a bowl within a period of 5 seconds. Stirring was continued for 1 minute to ensure homogenous distribution A homogeneous mix of all three components was made, the glycerol being evenly distributed amongst the fibre particles. The mix was allowed to stand in warm storage (50° C.) before use in chocolate.

Alternatively the mixture can be allowed to cool and solidify, e.g. at ambient temperature.

Example 5

Viscosity Development Over Time of Chocolate Product Containing Tropicalizing Agent According to Example 1

A doughLAB (Newport Scientific) viscosity tester was used to follow the change of apparent viscosity following addition of tropicalizing agent to liquid chocolate. Three different samples were tested:
  (i) Tempered milk chocolate
  (ii) Tempered milk chocolate with direct addition of 0.5% glycerol (wt/wt)
  (iii) Tempered milk chocolate with addition of tropicalizing agent of the invention according to Example 1, to a level of 1% glycerol (wt/wt).

Tempered milk chocolate was loaded into a doughLAB (Newport Scientific) viscosity tester maintained at 30° C. and its viscosity monitored over time as a function of the torque generated on the turning mixing elements of the machine at a fixed speed of 30 r.p.m.

The same measurements were made using samples from the same batch of tempered milk chocolate, under the same conditions in the doughLAB (Newport Scientific) viscosity tester maintained at 30° C.; but (a) with 0.5% glycerol (weight percent) added directly to the chocolate in the viscosity tester instrument at the outset of the test (time=0), and (b) with 1% glycerol (weight percent) added at the outset of the test (time=0) by addition of the tropicalizing agent made according to Example 1.

Figure 3:
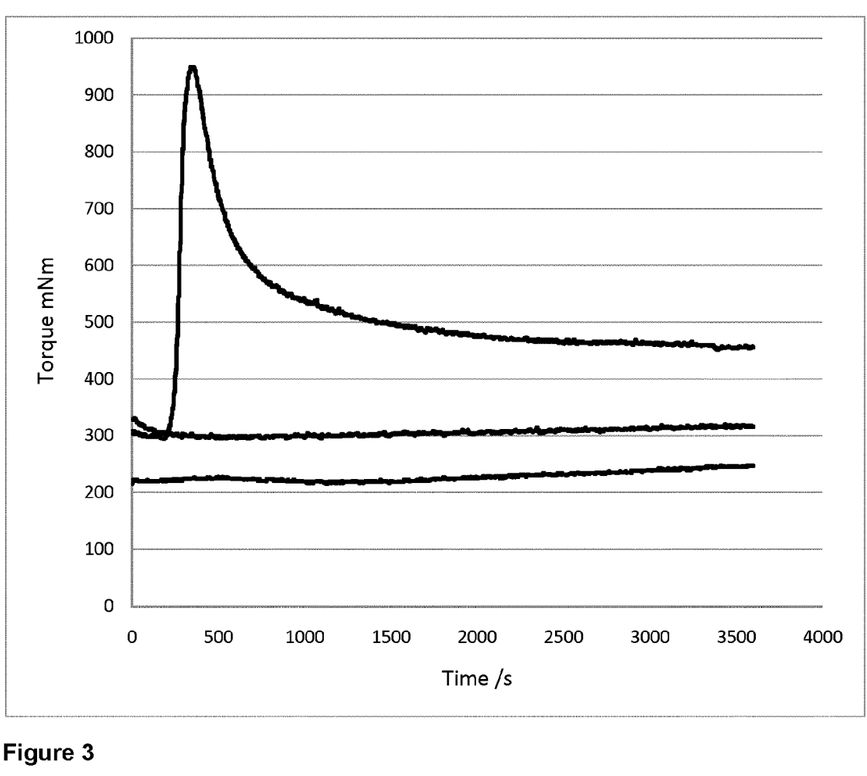
FIG. 3 shows a graphical representation of the torque on mixing over time for a liquid chocolate product containing tropicalizing agent according to one embodiment of the invention, compared to a reference chocolate product, and to the reference chocolate product containing 0.5% glycerol.

The results are illustrated in FIG. 3, which illustrate torque (mNm) over time (seconds). The top plot represents chocolate with direct addition of 0.5% glycerol, the middle plot represents reference chocolate, and the bottom plot line represents chocolate with addition of tropicalizing agent made according to example 1 (1% glycerol).

It can be seen that over a period of 1 hour under slow agitation the reference chocolate showed almost no increase of viscosity. In clear contrast, the addition of 0.5% glycerol provoked a sharp increase in the viscosity to a peak followed by a fall in torque on the machine as the pasty mass was further sheared and worked. In clear contrast again, the sample with 1% glycerol added by the addition of the tropicalizing agent of Example 1 showed negligible viscosity rise over the test period of 1 hour after the addition of the tropicalizing agent.

It is clear that the chocolate with 1% glycerol added by the addition of the tropicalizing agent of Example 1 retains sufficiently low viscosity to allow it to be worked and moulded in industrial chocolate manufacturing processes. Whereas, in contrast, the sharp increase in viscosity produced by the direct addition of 0.5% glycerol makes it impossible to work and mould such a chocolate in conventional industrial processes.

The chocolate with 1% glycerol added by the addition of the tropicalizing agent of Example 1 was then poured from the doughLAB vessel and moulded into chocolate tablets for subsequent testing for heat stability.

Example 6

Heat Stability of Tropicalized Chocolate Product According to the Invention

Measurement of Shape Retention

The technique applied to evaluate the shape and dimensional stability of chocolate subject to high temperatures comprises:
(i) Forming the liquid chocolate samples (reference chocolate and tropicalized chocolate comprising different embodiment(s) of tropicalizing agent according to the invention) into bars with standardised dimensions by pouring into moulds of identical dimensions, and allowing to cool and solidify.
(ii) Demoulding the chocolate bars and measuring the dimensions (length×width) of the solid chocolate bar before heating
(iii) Heating the chocolate bars on a horizontal metal tray to 40° C. for adequate time to fully melt the fat matrix (1 hour heating applied in these tests).
(iv) Then subjecting the sample to mechanical shock in the form of repeated forced impact from vertically below. Allowing the chocolate to cool and re-solidify, and then measuring the dimensions of the minimum rectangular area that fully contains the spread of the sample chocolate product after heat treatment.
(v) Calculation of the shape retention index SRI $(l_1 \times w_1)/(l_2 \times w_2)$ and/or the shape stability index (SI)

$$SI = \left(\frac{l_2^c \cdot w_2^c}{l_2^t \cdot w_2^t}\right)$$

where $l_1$ and $w_1$ are the length and width of the bar before heating, and $l_2$ and $w_2$ are the length and width dimensions of the minimal rectangle area that fully contains the sample after heat and mechanical shock test, and the superscript c stands for the control reference sample and t stands for the test sample.

Figure 1:
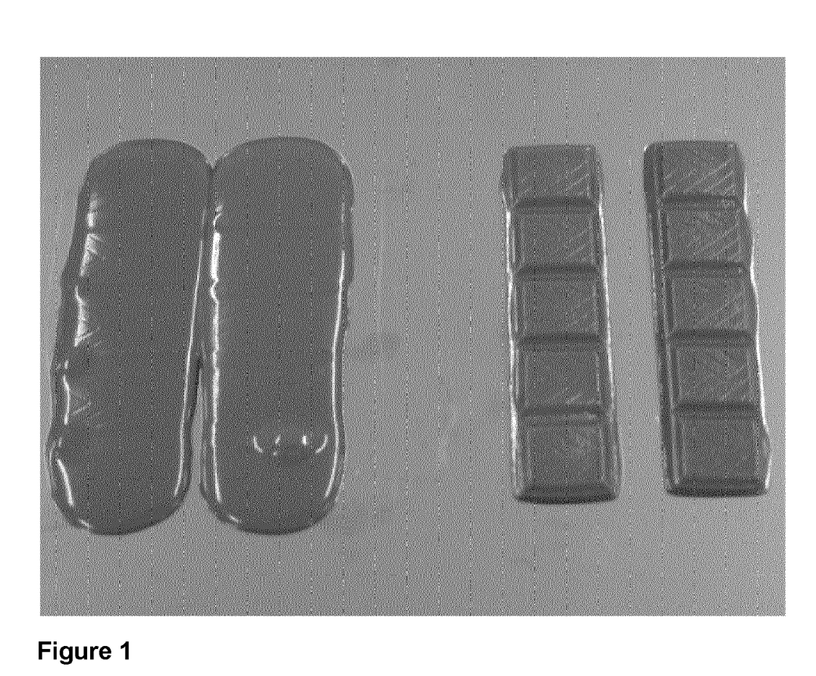
FIG. 1 shows a representation of a chocolate product containing tropicalizing agent according to one embodiment of the invention, after heating at 45° C. and being subject to mechanical shock, compared to a reference standard chocolate product.

FIG. 1 gives a photographic representation of the reference milk chocolate bar (left) and the test milk chocolate bar containing tropicalizing agent (right) after the heat and mechanical shock treatment.

It is found that standard chocolate loses all shape integrity and will spread across the tray, whereas chocolate with a degree of heat stability will resist such deformation and will retain some form. By standardising the dimensions of the initial moulded sample and by measuring the minimal rectangular area that fully contains the spread of the sample after test, an index can be derived to describe the degree of shape stability relative to the reference or relative to the original moulded dimensions.

The test method described gives a quantitative shape retention index (SRI) that can be used in any laboratory and does not require specialized rheometry. The higher the value of the SRI above unity, the lower the degree of heat shape stability.

In a first test tempered standard milk chocolate (reference sample) and chocolate with 1% glycerol added via addition of tropicalizing agent according to example 1 were moulded after measurement in the dough LAB tester (according to Example 5) and allowed to mature under storage at 28° C. for 1 week.

The moulded tablet had dimensions of 100×22×7 mm. Hence the base area was 2200 mm².

After the heat treatment and mechanical shock testing the reference sample spread to dimensions enclosed by a minimum size rectangle of 115×37 mm, hence 4255 mm². Whereas, the sample containing the tropicalizing agent was contained in a rectangle of 2900 mm² after the test.

The different areas can be ratioed to give useful indexes. For example the test sample can be described as having a shape retention index (SRI) of $(l_1 \times w_1)/(l_2 \times w_2)$ relative to the original tablet size, where and $w_1$ are the length and width of the bar before heating, and $l_2$ and $w_2$ are the length and width dimensions of the minimal rectangle area that fully contains the sample after heat and mechanical shock test. In this case 2900:2200 gives an index (SRI) of 1.32. Whereas the reference sample has an index (SRI) of 1.93. A perfectly shape stable sample would have an SRI index of 1. The higher the SRI value greater than unity, the less the sample is stable.

Alternatively the shape stability of the test samples may be evaluated as a shape stability index relative (SI) to the stability of the reference sample after the heat and mechanical shock treatment. Whereby the test sample is 4255:2900 stable relative to its reference: a shape stability index (SI) of 1.47. A test sample with an SI of 1 would have the same degree of shape stability as the reference sample. The higher the SI ratio the greater the heat shape stability of the test sample.

Example 7

Heat Stability Development of Tropicalized Chocolate Products

Further Stability Results and the Effect of Maturation Time and Temperature.

Four different samples were tested:
- (i) Tempered milk chocolate
- (ii) Tempered milk chocolate with addition of tropicalizing agent of the invention according to Example 1, to a level of 2% glycerol (wt/wt).
- (iii) Tempered milk chocolate with addition of tropicalizing agent of the invention according to Example 2, to a level of 2% water (wt/wt).
- (iv) Tempered milk chocolate with addition of tropicalizing agent of the invention according to Example 3, to a level of 1% glycerol (wt/wt) and 1% water (wt/wt).

60 g of tropicalizing agent according to example 1 was added to 940 g of tempered milk chocolate at 30° C. with continuous manual mixing for 20 minutes in order to provide sample with 2% glycerol. The tropicalizing agent readily dispersed in the liquid chocolate. Additional samples were prepared in the same manner with the tropicalizing agents of examples 2 and 3 equivalent to 2% water and 1% water/1% glycerol respectively.

It was found that upon the addition of a dose of tropicalizing agent into the chocolate providing a dosage of about 1-2 weight % glycerol and/or water (based on the final chocolate product) there is minimal increase in the viscosity of the chocolate which is maintained above the solidification temperature of the fat continuum, even upon prolonged storage with stirring up to 1 hour or even more after the addition. Consequently this chocolate remained suitable for application and forming by conventional depositing and moulding.

Moulded tablets (100×22×7 mm) of each of the test and reference samples were wrapped in heat-sealed laminate film and stored in a stove at 28° C./60% relative humidity (RH). Stability tests under the conditions of Example 6 were performed at times after zero, 1, 2 and 4 weeks maturation.

Figure 2:
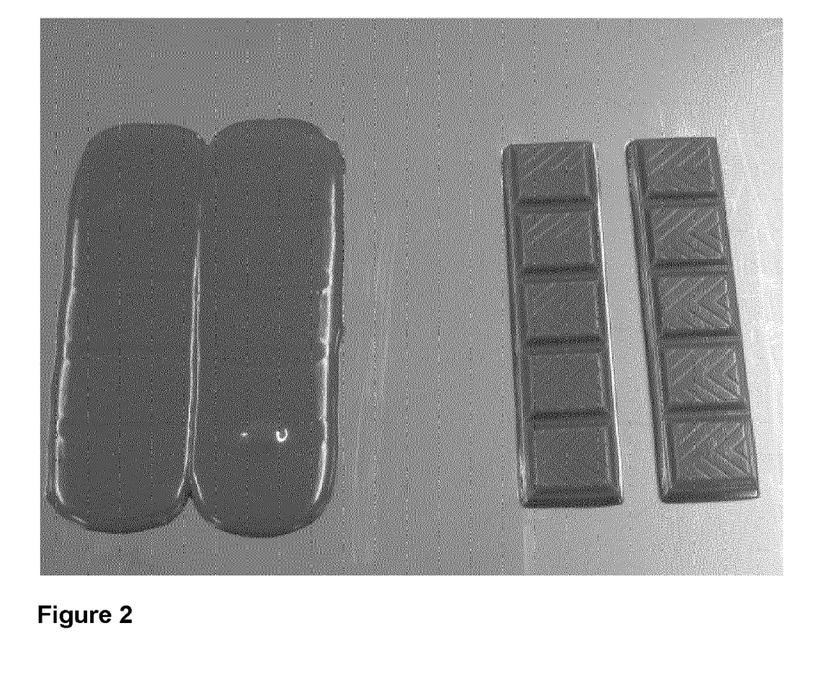
FIG. 2 shows a representation of a chocolate product containing tropicalizing agent according to certain embodiments of the invention, after heating at 45° C. and being subject to mechanical shock, compared to a reference standard chocolate product.

FIG. 2 gives a photographic representation of the reference milk chocolate bar (left) and the test milk chocolate bar containing tropicalizing agent (right) after the heat and mechanical shock treatment, for the samples having been matured at 28° C./60% relative humidity (RH) for 2 weeks.

Table 1 below shows the results of shape stability tests on chocolates containing the agents described in Examples 1-3 (ii), (iii) and (iv) respectively, compared to the reference tempered milk chocolate (i).

TABLE 1

Area framing the spread of chocolate following mechanical shock at 40° C. (mm²)
Stability Index (SI) relative to its reference.
Moulded tablets (100 × 22 × 7 mm. Milk chocolate.

| Maturation Time @28° C. | Reference Chocolate | Plus 2% Glycerol in Chocolate (Example 1) | Plus 2% Water in Chocolate (Example 2) | Plus 1% Glycerol +1% Water (Example 3) |
|---|---|---|---|---|
| 0 | 5400 | 4180 mm² SI 1.29 | 3150 mm² SI 1.71 | 4746 mm² SI 1.14 |
| 1 Week | 5400 | 2781 mm² SI 1.94 | 2754 mm² SI 1.96 | 3240 mm² SI 1.67 |
| 2 Weeks | 4485 | 2940 mm² SI 1.53 | 2835 mm² SI 1.58 | 3850 mm² SI 1.16 |
| 4 Weeks | 4256 | 3060 mm² SI 1.39 | 3150 mm² SI 1.35 | 3520 mm² SI 1.21 |

The results show improved heat stability for all of the samples containing tropicalizing agent according to the invention compared to the reference standard milk chocolate sample, even when tested at zero maturation time after preparation. It is seen that increased shape stability is achieved quickly, and without the need for any additional step for triggering the release of the glycerol/water and the onset of heat stability.

It can be seen from the results that shape stability developed with time for all samples. The chocolate with added water was most quickly showing stability relative to the reference whereas the glycerol and glycerol and water samples were slower to develop high resistance. After one week of maturation at 28° C./60% relative humidity (RH) the test samples had fully developed their heat stability. After very prolonged maturation under the accelerated maturation conditions the degree of heat stability appeared to drop off for all of the reference and test samples.

Example 8

Heat Stability of Tropicalized Chocolate Product According to One Embodiment of the Invention Comprising Propylene Glycol Tropicalizing agent was prepared with a composition as follows:

| | |
|---|---|
| Cocoa Butter | 300 g |
| Herbacel AQPlus Citrus Fibre | 100 g |
| Humectants | 200 g |
| Lecithin | 2.5 g |

Two samples were made with different humectants: (i) glycerol as the humectant and (ii) propylene glycol as the humectant 1) 300 g of cocoa butter (melted) was mixed with 2.5 g of sunflower lecithin in a Kenwood Food Processor for 20 seconds.
2) 100 g of Citrus Fibre was added to the mixture and mixed for 60 seconds.
3) 200 g of humectant (glycerol or propylene glycol) was added dropwise over 30 minutes via a peristaltic pump, whilst mixing continuously to ensure homogenous distribution.

In both cases a homogeneous mix of all three components was made, the humectant being evenly distributed amongst the fibre particles. The mix was allowed to stand in warm storage (45° C.) for 12 hours before addition to liquid chocolate.

Alternatively the mixture can be allowed to cool and solidify, e.g. at ambient temperature.

90 g of the thus prepared tropicalizing agent was added to 1.41 Kg of tempered chocolate compound at 45° C., over 60 seconds, with continuous mixing at 105 rpm in a jacketed stirring vessel. Stirring was continued at 45° C. and 105 rpm for 15 minutes, Chocolate compound as below was used:

| | |
|---|---|
| Sugar | 45.7% w/w |
| Vegetable Fat | 29% w/w |
| Skimmed Milk Powder | 20% w/w |
| Cocoa Powder | 5% w/w |
| Lecithin | 0.3% w/w |
| TOTAL | 100% w/w |

It was found that upon the addition of the tropicalizing agent comprising either glycerol or propylene glycol into the chocolate compound there is minimal increase in the viscosity of the compound, even upon prolonged storage with stirring up to 1 hour or even more after the addition. Consequently the compound remained suitable for application and forming by conventional depositing and moulding.

The chocolate compound with tropicalizing agent comprising glycerol or propylene glycol was then moulded in sample pots for subsequent testing for heat stability. The sample pots were sealed and were cooled at 5° C. for 5 minutes. The samples were then stored in sealed pots at 45° C. in an oven for 20 hours. The samples were then allowed to cool to room temperature before being subject to a 45° C. for 2 hours, and then subjected to heat stability testing.

Heat stability of the compound samples comprising the different tropicalizing agents was analysed on a texture analyser. The tests were carried out on a Stable Microsystems TA.XT texture analyser fitted with a 40 mm back extrusion disc. Penetration depth to 2.5 mm was measured at a speed of 1.00 mm/s, with a trigger force of 0.1 N. The higher the maximum force (maximum force=force required for penetration of the 40 mm disk to a depth of 2.5 mm in the sample) measured by the texture analyser the firmer the compound sample, and therefore the greater the heat stability of the compound sample.

Results for the compound samples prepared with glycerol and propylene glycol are shown below in table 2:

TABLE 2

| Humectant | Max Force/N |
|---|---|
| Glycerol | 50 |
| Propylene glycol | 50 |

From the results it is seen that the use of propylene glycol a humectant gave as good heat stability properties as for glycerol as the humectant.

Example 9

Preparation of a Tropicalizing Agent According to an Alternative Embodiment of the Invention Tropicalizing agent was prepared with a composition as follows:

| | |
|---|---|
| Herbacel AQPlus Citrus Fibre | 100 g |
| glycerol | 200 g |

1) 100 g of Citrus Fibre was added to 200 g of glycerol and mixed by hand to ensure homogenous distribution.
2) The mixture was stored at 45° C. for 5 hours, resulting in a crumbly solid mass, which was then passed through a 300 micron sieve.
3) 43 g of the sieved solid was then dispersed in 1.44 Kg of chocolate compound and mixed by hand for 5 minutes.

It was found that upon the addition of the tropicalizing agent of Example 9 into the chocolate compound viscosity of the compound is almost identical to that of the corresponding tropicalized compound comprising glycerol prepared according to Example 8. Consequently this compound remained suitable for application and forming by conventional depositing and moulding.

Heat stability of the thus produced tropicalized compound mass was tested as described in Example 8, and compared to the sample of Example 8 comprising glycerol, showing that corresponding heat stability properties were achieved

TABLE 3

| Tropicalising Agent | Max Force/N |
|---|---|
| Prepared in Example 8 (Glycerol) | 50 |
| Prepared in Example 9 | 50 |

Example 10

Heat Stability of Tropicalized Chocolate Products Comprising Different Tropicalizing Agents According to Embodiments of the Invention Samples of tropicalizing agent comprising different carrier materials were prepared as below:

| | |
|---|---|
| Cocoa Butter | 300 g |
| Carrier material | 100 g |
| Glycerol | 200 g |
| Lecithin | 2.5 g |

1) 300 g of cocoa butter (melted) was mixed with 2.5 g of sunflower lecithin in a Kenwood Food Processor for 20 seconds.
2) 100 g of Citrus Fibre was added to the mixture and mixed for 60 seconds.
3) 200 g of glycerol was added dropwise over 30 minutes via a peristaltic pump, whilst mixing continuously to ensure homogenous distribution.

The mix was allowed to stand in warm storage (45° C.) for 12 hours before addition to liquid chocolate.

Samples of compound were prepared and heat stability tested according to the protocol set out in Example 8. Results are shown below in Table 4.

TABLE 4

| Carrier | Max Force/N |
|---|---|
| Citrus Fibre AQ+ (Herbafood) | 50 |
| Sugar Cane Fibre (International Fibre Co.) | 35 |
| Defatted Cocoa Powder (Barry Callebaut) | 15 |
| Potato KF100 (Vitacel ®, Rettenmaier) | 50 |
| MicroCrystalline Cellulose (Vivapur ®, Rettenmaier) | 50 |

TABLE 4-continued

| Carrier | Max Force/N |
| --- | --- |
| Carob UP (Carob fibre, Wilde) | 45 |
| Oat HF400 (Vitacel ®, Rettenmaier) | 50 |
| Apple 401 (Vitacel ®, Rettenmaier) | 50 |
| Wheat WF101 (Vitacel ®, Rettenmaier) | 50 |
| Sugar Beet 575 (Vitacel ®, Rettenmaier) | 50 |

From the above it can be seen that the compound samples prepared with tropicalising agent comprising the insoluble citrus fibres, potato fibres, microcrystalline cellulose, oat fibres, apple fibres, wheat fibres and sugar beet all showed similar good heat stability properties.

The invention claimed is:

1. A method for introducing a humectant into a chocolate product, the method comprising:
providing a humectant to the chocolate product using a tropicalizing agent comprising (1) particles of insoluble water-absorbing food ingredient as a carrier for the humectant, and (2) 30-95% w/w of cocoa butter, the particles of insoluble water-absorbing food ingredient comprise dietary fiber, the humectant is a polyol selected from the group consisting of sorbitol, xylitol, maltitol, mannitol, and any mixture thereof, and the tropicalizing agent is 0.5-10% w/w of the chocolate product.

2. A tropicalizing agent comprising:
discrete particles of insoluble food ingredient material loaded with a humectant liquid, the particles of insoluble food ingredient material comprise dietary fiber, and the humectant liquid is a polyol selected from the group consisting of sorbitol, xylitol, maltitol, mannitol, and any mixture thereof; and
30-95% w/w of cocoa butter.

3. The tropicalizing agent of claim 2, wherein the discrete particles of insoluble food ingredient material loaded with the humectant liquid are dispersed in the cocoa butter.

4. The tropicalizing agent of claim 2, wherein the humectant liquid is 0.5% to 2% w/w of the product.

5. The tropicalizing agent of claim 2, wherein the dietary fiber is selected from the group consisting of citrus fiber, apple fiber, oat fiber, potato fiber, pea fiber and mixtures thereof.

6. The tropicalizing agent of claim 2, wherein the dietary fiber comprises citrus fiber particles.

7. The tropicalizing agent of claim 2 comprising the humectant liquid and the insoluble water-absorbing food particles in a ratio from 1:10 to 8:1 w/w.

8. The tropicalizing agent of claim 2, wherein the particles of insoluble food ingredient material have an average particle size of less than 50 microns.

9. A tropicalized chocolate product comprising 0.5-10% w/w of a tropicalizing agent comprising:
discrete particles of insoluble food ingredient material loaded with a humectant liquid based on the total weight of the chocolate product, the insoluble particles of insoluble food ingredient material comprise dietary fiber, and the humectant liquid is a polyol selected from the group consisting of sorbitol, xylitol, maltitol, mannitol, and any mixture thereof; and
30-95% w/w of cocoa butter.

10. A method for the preparation of a tropicalizing agent, the method comprising:
(a) mixing insoluble water-absorbing food ingredient particles in 30-95% w/w of cocoa butter, the insoluble water-absorbing food ingredient particles comprise dietary fiber; and
(b) adding a humectant liquid to the mixture of step (a) in an amount to provide a ratio of the humectant liquid to the insoluble water-absorbing food ingredient particles such that the humectant liquid is absorbed by the particles, the humectant liquid is a polyol selected from the group consisting of sorbitol, xylitol, maltitol, mannitol, and any mixture thereof.

11. A method of improving the heat shape stability of a chocolate product, the method comprising:
adding a tropicalizing agent comprising (1) discrete particles of insoluble food ingredient material loaded with a humectant liquid and (2) 30-95% w/w of cocoa butter, to a liquid mass of chocolate or chocolate analogue, the particles of insoluble food ingredient material comprise dietary fiber, the humectant liquid is a polyol selected from the group consisting of sorbitol, xylitol, maltitol, mannitol, and any mixture thereof, and the tropicalizing agent is 0.5-10% w/w of the chocolate product.

* * * * *